(12) United States Patent
Wang et al.

(10) Patent No.: US 12,488,003 B2
(45) Date of Patent: Dec. 2, 2025

(54) DATA QUERY METHODS AND APPARATUSES, STORAGE MEDIA, AND ELECTRONIC DEVICES

(71) Applicant: Alipay (Hangzhou) Information Technology Co., Ltd., Zhejiang (CN)

(72) Inventors: Tao Wang, Hangzhou (CN); Lincheng Ge, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/962,567

(22) Filed: Nov. 27, 2024

(65) Prior Publication Data

US 2025/0117390 A1    Apr. 10, 2025

Related U.S. Application Data

(63) Continuation of application No. PCT/CN2023/110634, filed on Aug. 1, 2023.

(30) Foreign Application Priority Data

Aug. 29, 2022 (CN) .......................... 202211043590.7

(51) Int. Cl.
- *G06F 16/24* (2019.01)
- *G06F 16/2455* (2019.01)
- *G06F 40/211* (2020.01)

(52) U.S. Cl.
CPC ...... *G06F 16/24553* (2019.01); *G06F 40/211* (2020.01)

(58) Field of Classification Search
CPC ......... G06F 16/24553; G06F 16/24542; G06F 16/2453
See application file for complete search history.

(56) References Cited

U.S. PATENT DOCUMENTS

| 11,194,808 B1* | 12/2021 | Adams ............ G06F 16/24544 |
| 2021/0263929 A1* | 8/2021 | Chen ................ G06F 16/24539 |

(Continued)

FOREIGN PATENT DOCUMENTS

| CN | 111190924 A | 5/2020 |
| CN | 112860730 A | 5/2021 |

(Continued)

OTHER PUBLICATIONS anquan.baidu.com, "HugeGraph," available on or before Jun. 1, 2022, via Internet Archive: Wayback Machine URL<https://web.archive.org/web/20220601083913/https://anquan.baidu.com/product/hugegraph>, retrieved on May 12, 2025, retrieved from URL<https://anquan.baidu.com/product/hugegraph>, 6 pages (with English machine translation).

(Continued)

*Primary Examiner* — Loc Tran
(74) *Attorney, Agent, or Firm* — Fish & Richardson P.C.

(57) ABSTRACT

This specification discloses data query methods and apparatuses, storage media, and electronic devices. In an example method, a query statement input by a user is obtained, where the query statement is used to query data from a database. Based on the query statement, an execution plan corresponding to the query statement is generated. Based on the execution plan, each query operation involved in the execution plan and an execution order of query operations are; determined. A target operation from the query operations is determined based on the execution order of the query operations, where the target operation is an operation other than a last query operation to be executed among the query operations. When executing the execution plan, deduplication is performed on duplicate results included in query results obtained by executing the target operation. Based on (Continued)

deduplicated query results, query data corresponding to the query statement is obtained.

18 Claims, 3 Drawing Sheets

(56) References Cited

U.S. PATENT DOCUMENTS

| | | | |
|---|---|---|---|
| 2021/0286816 | A1 | 9/2021 | Cruanes et al. |
| 2022/0043817 | A1 | 2/2022 | Li et al. |

FOREIGN PATENT DOCUMENTS

| | | |
|---|---|---|
| CN | 113535753 A | 10/2021 |
| CN | 115391426 A | 11/2022 |

OTHER PUBLICATIONS geeksforgeeks.org, "Neo4j Introduction," available on or before Jul. 30, 2021, via Internet Archive: Wayback Machine URL<https://web.archive.org/web/20210730220814/https://www.geeksforgeeks.org/neo4j-introduction/>, retrieved on May 12, 2025, retrieved from URL<https://www.geeksforgeeks.org/neo4j-introduction/>, 4 pages.

hugegraph.apache.org, "Apache HugeGraph Incubating," available on or before Jul. 9, 2022, via Internet Archive: Wayback Machine URL<https://web.archive.org/web/20220709145859/https://hugegraph.apache.org/>, retrieved on May 12, 2025, retrieved from URL<https://hugegraph.apache.org/>, 4 pages.

International Preliminary Report on Patentability in International Appln. No. PCT/CN2023/110634, mailed on Mar. 13, 2025, 12 pages (with English translation).

International Search Report and Written Opinion in International Appln. No. PCT/CN2023/110634, mailed on Oct. 23, 2023, 14 pages (with English translation).

linkedin.com, "NebulaGraph Database," available on or before Dec. 3, 2024, via Internet Archive: Wayback Machine URL<https://web.archive.org/web/20241203141541/https://www.linkedin.com/company/nebula-graph/>, retrieved on May 12, 2025, retrieved from URL<https://www.linkedin.com/company/nebula-graph>, 11 pages.

nebula-graph.io, "Open Source and Distributed Graph Database | Graph Technology | Nebula Graph," available on or before Aug. 26, 2022, via Internet Archive: Wayback Machine URL<https://web.archive.org/web/20220826231651/https://www.nebula-graph.io/>, retrieved on May 12, 2025, retrieved from URL<https://www.nebula-graph.io/>, 18 pages.

neo4j.com, "Graph Data Platform | Graph Data Applications & Tools | Neo4j," available on or before Aug. 15, 2022, via Internet Archive: Wayback Machine URL<https://web.archive.org/web/20220815024708/https://neo4j.com/product/>, retrieved on May 12, 2025, retrieved from URL<https://neo4j.com/product/>, 19 pages.

prweb.com, "The future of graph database: vesoft unveils Nebula Graph 2.0 GA," Mar. 24, 2021, retrieved on May 12, 2025, retrieved from URL<https://www.prweb.com/releases/the-future-of-graph-database-vesoft-unveils-nebula-graph-2-0-ga-811531462.html>, 4 pages.

iAnywhere Solutions, Inc., " Plan Caching," SQL Anywhere 12.0.1 > SQL Anywhere Server—SQL Usage > Query and modify data > Queries > Advanced: Query optimization > How the optimizer works, Sybase, 2012, 1 page.

Extended European Search Report in European Appln. No. 23859050.9, mailed on Jul. 31, 2025, 11 pages.

Zeng et al., "Redesign of the gStore system," Frontiers of Computer Science, Jan. 9, 2018, 12(4):623-641.

* cited by examiner

DATA QUERY METHODS AND APPARATUSES, STORAGE MEDIA, AND ELECTRONIC DEVICES

CROSS-REFERENCE TO RELATED APPLICATIONS

This application is a continuation of PCT Application No. PCT/CN2023/110634, filed on Aug. 1, 2023, which claims priority to Chinese Patent Application No. 202211043590.7, filed on Aug. 29, 2022, and each application is hereby incorporated by reference in its entirety.

TECHNICAL FIELD

This specification relates to the field of computer technologies, and in particular, to data query methods and apparatuses, storage media, and electronic devices.

BACKGROUND

Graph databases are currently widely used databases that can store data such as privacy data and service data. In a graph database, data are stored in a form of nodes and edges, making it easy to describe an association relationship between data entities. For example, assuming that information of employees of a company needs to be saved, information of each employee of the company is saved to each node (information of one employee is saved to one node), and a relationship between any two employees (such as a colleague relationship or a leader-subordinate relationship) can be represented by an edge between two nodes corresponding to the two employees.

However, currently, when a user needs to query data in a graph database, the data query efficiency is often low.

SUMMARY

This specification provides data query methods and apparatuses, storage media, and electronic devices to resolve a problem that efficiency of querying data in a database in a related technology is low.

The following technical solutions are used in this specification. This specification provides a data query method, including: obtaining a query statement input by a user, where the query statement is used to query data from a database; generating, based on the query statement, an execution plan corresponding to the query statement; determining, based on the execution plan, each query operation involved in the execution plan and an execution order of query operations; determining a target operation from the query operations based on the execution order of the query operations, where the target operation is an operation other than a last query operation to be executed among the query operations; and when executing the execution plan, performing deduplication on duplicate results included in query results obtained by executing the target operation, and obtaining, based on deduplicated query results, query data corresponding to the query statement.

Optionally, the generating, based on the query statement, an execution plan corresponding to the query statement specifically includes: performing syntax parsing on the query statement to obtain a syntax tree corresponding to the query statement; and generating, based on the syntax tree, the execution plan corresponding to the query statement.

Optionally, the determining a target operation from the query operations based on the execution order of the query operations specifically includes: determining whether any historical execution plan among historical execution plans matches the execution plan; and if no, determining the target operation from the query operations based on the execution order of the query operations.

Optionally, the method further includes: if it is determined that a historical execution plan among the historical execution plans matches the execution plan, determining the target operation from the query operations based on the historical execution plan matching the execution plan.

Optionally, the determining a target operation from the query operations based on the execution order of the query operations specifically includes: determining, for each query operation involved in the execution plan, a query object corresponding to the query operation; and determining the target operation from the query operations based on an association relationship between query objects corresponding to the query operations and the execution order of the query operations.

Optionally, before the performing deduplication on duplicate results included in query results obtained by executing the target operation when executing the execution plan, the method further includes: determining, based on a position of an operation instruction corresponding to the target operation in the execution plan, a position for inserting a deduplication operation in the execution plan as a target position; and inserting a deduplication operation instruction into the execution plan based on the target position to generate an optimized execution plan; and the performing deduplication on duplicate results included in query results obtained by executing the target operation when executing the execution plan specifically includes: when executing the optimized execution plan, performing, based on the inserted deduplication operation instruction, deduplication on the duplicate results included in the query results obtained by executing the target operation.

Optionally, the inserting a deduplication operation instruction into the execution plan based on the target position specifically includes: determining a deduplication operation instruction included in the execution plan; and adding the included deduplication operation instruction to the target position.

This specification provides a data query apparatus, including: an obtaining module, configured to obtain a query statement input by a user, where the query statement is used to query data from a database; a generation module, configured to generate, based on the query statement, an execution plan corresponding to the query statement; a first determining module, configured to determine, based on the execution plan, each query operation involved in the execution plan and an execution order of query operations; a second determining module, configured to determine a target operation from the query operations based on the execution order of the query operations, where the target operation is an operation other than a last query operation to be executed among the query operations; and a query module, configured to perform deduplication on duplicate results included in query results obtained by executing the target operation when executing the execution plan, and obtain, based on deduplicated query results, query data corresponding to the query statement.

This specification provides a computer-readable storage medium. The storage medium stores a computer program. When the computer program is executed by a processor, the above-mentioned data query method is implemented.

This specification provides an electronic device, including a memory, a processor, and a computer program stored in the memory and capable of running on the processor. When the processor executes the program, the above-mentioned data query method is implemented.

At least one of the above-mentioned technical solutions used in this specification can achieve the following beneficial effects. In the data query method provided in this specification, first, the query statement input by the user is obtained, where the query statement is used to query the data from the database; the execution plan corresponding to the query statement is generated based on the query statement; each query operation involved in the execution plan and the execution order of the query operations are determined based on the execution plan; the target operation is determined from the query operations based on the execution order of the query operations, where the target operation is the operation other than the last query operation to be executed among the query operations; and when the execution plan is executed, deduplication is performed on the duplicate results included in the query results obtained by executing the target operation, and the query data corresponding to the query statement is obtained based on the deduplicated query results.

As can be learned from the above-mentioned method, based on the execution order of the query operations involved in the execution plan generated when the query statement is executed by the database, it can be determined which query operations in the execution plan are subject to deduplication of query results. This can reduce task load in subsequent query operations executed by the database and deduplicate the query results of the determined query operations, thereby improving efficiency of querying data in the database.

BRIEF DESCRIPTION OF DRAWINGS

The accompanying drawings described here are used to provide further understanding of this specification and constitute a part of this specification. The example embodiments of this specification and their descriptions are used to explain this specification, and do not constitute an undue limitation on this specification. In the accompanying drawings.

DESCRIPTION OF EMBODIMENTS

To make the objectives, technical solutions, and advantages of this specification clearer, the following clearly and comprehensively describes the technical solutions of this specification with reference to specific embodiments of this specification and corresponding accompanying drawings. It is clear that the described embodiments are merely some but not all of embodiments of this specification. Based on embodiments of this specification, all other embodiments obtained by a person of ordinary skill in the art without creative efforts fall within the protection scope of this specification.

The following describes in detail the technical solutions provided in the embodiments of this specification with reference to the accompanying drawings.

Figure 1:
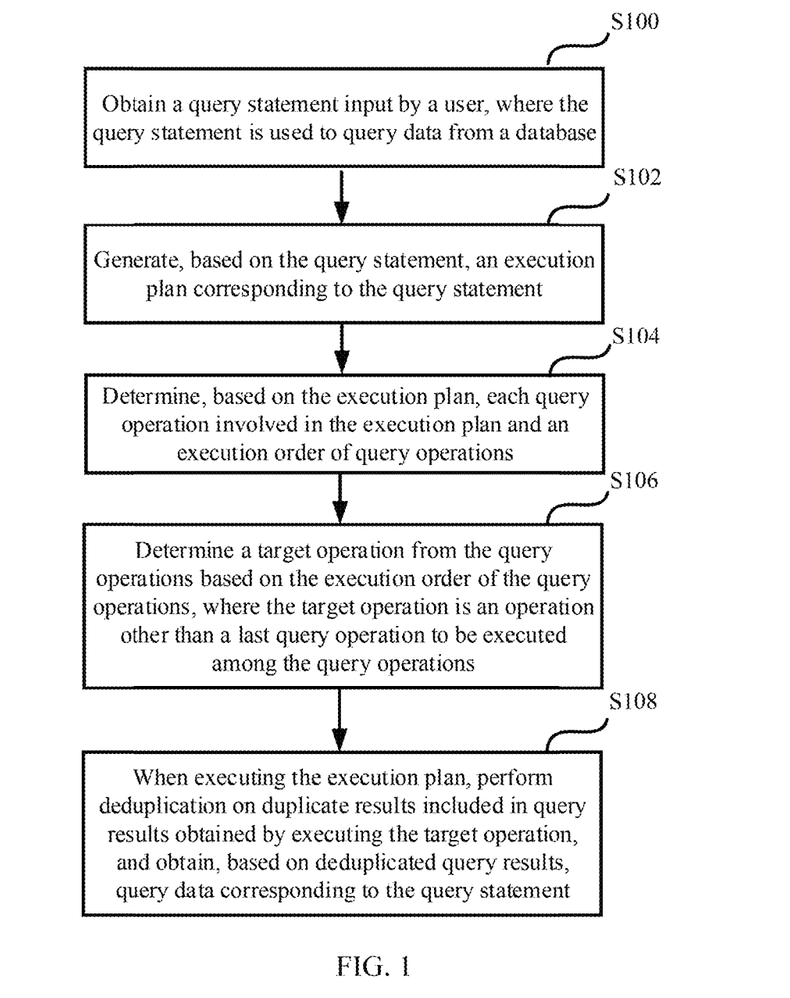
FIG. 1 is a schematic flowchart illustrating a data query method, according to this specification.

FIG. 1 is a schematic flowchart illustrating a data query method, according to this specification. The method includes the following steps S100 to S108.

S100: Obtain a query statement input by a user, where the query statement is used to query data from a database.

In actual applications, the database can obtain the query statement input by the user, generate an execution plan based on the query statement input by the user, and then query corresponding data based on the generated execution plan, where the query statement can be a query statement input by the user through a terminal device used by the user.

In this specification, an entity for executing the data query method may be a terminal device deployed with a database, such as a desktop computer, a laptop computer, or other terminal devices, or may be a designated device such as a server. For case of description, the following only uses the server as an example of the execution entity to describe the data query method provided in this specification.

S102: Generate, based on the query statement, an execution plan corresponding to the query statement.

S104: Determine, based on the execution plan, each query operation involved in the execution plan and an execution order of query operations.

After obtaining the query statement input by the user, the server can perform syntax parsing on the query statement to obtain a syntax tree corresponding to the query statement (that is, an inference result of statement meaning inference based on a statement pattern of the query statement), and then generate, based on the parsed syntax tree by using an execution plan generator (a component in the database), the execution plan corresponding to the query statement, where the execution plan is used to represent the query operations involved when the database executes the query statement and the execution order of the query operations.

For example, assuming that the query statement is "query names of books read by friends of friends of user named A", the database first queries who are the friends of user named A. Assuming that query results are B and C, the database then continues to query who are friends of B and C, then queries what books have been read by the friends of the friends of user named A, and finally obtains the names of these books. The query operations executed by the database here and an execution order of these query operations are an execution plan.

It is worthwhile to note that, in addition to being used to represent the query operations involved when the database executes the query statement and the execution order of the query operations, the execution plan can be further used to represent a path by which the database executes these query operations, and a method for executing these query operations, for example, whether to query data based on an index.

It can be learned from the above-mentioned content that after the server generates the execution plan corresponding to the query statement, the server can determine the query operations involved in the execution plan and the execution order of the query operations.

S106: Determine a target operation from the query operations based on the execution order of the query operations, where the target operation is an operation other than a last query operation to be executed among the query operations.

After determining, based on the execution plan, the query operations involved in the execution plan and the execution order of the query operations, the server can determine the target operation from the query operations based on the execution order of the query operations, where the target operation is an operation involved in the execution plan other than the last query operation to be executed among the query operations.

Specifically, for each query operation involved in the execution plan, the server can determine a query object corresponding to the query operation, and determine the target operation from the query operations based on an association relationship between query objects corresponding to the query operations and the execution order of the query operations.

In the above-mentioned content, a method for determining the target operation from the query operations based on the association relationship between the query objects corresponding to the query operations and the execution order of the query operations may be: for each query operation involved in the execution plan, determining, based on the execution order of the query operations, a previous query operation executed before the query operation is executed, and determining whether a query object of the query operation is directly dependent on a query object of the previous query operation. For example, assuming that the query statement is "query what books have been read by friends of friends of friends of a person named A", three query operations are involved, where the first one is "query who are friends of the person named A", the second one is "query who are friends of each friend of the person named A", and the third one is "query what books have been read by the friends of each friend of the person named A". Here, what books have been read by the friends of the friends of the person named A is completely dependent on who are the friends of the friends of the person named A. Therefore, it can be considered that the third query operation is completely dependent on the second query operation, that is, there is a direct dependency relationship between the first query operation and the second query operation in the above-mentioned content. In this case, it can be considered that the second query operation is the target operation.

In the above-mentioned content, the server can determine, by using a plurality of methods, whether the query object of the query operation is directly dependent on the query object of the previous query operation. For example, the server can determine, based on a predetermined condition, whether the query operation satisfies the predetermined condition, and if yes, consider that the query object of the query operation is directly dependent on the query object of the previous query operation. For another example, the server can perform lexical analysis on the query object of the query operation and the query object of the previous query operation, and then determine whether the query object of the query operation is directly dependent on the query object of the previous query operation.

In addition, the server can further determine a deduplication operation included in the execution plan, determine, based on the association relationship between the query objects corresponding to the query operations and the execution order of the query operations, an association relationship between a query object of a above-mentioned query operation executed before a query operation corresponding to the included deduplication operation in the execution order of the query operations and a query object of the query operation corresponding to the included deduplication operation, and determine whether the previous query operation executed before the query operation corresponding to the included deduplication operation in the execution order of the query operations is the target operation.

From the above-mentioned content, it can be learned that the server can deduplicate the query results of the query operations involved in the execution plan except the last query operation executed among the query operations, and therefore can continue to perform the query based on the deduplicated query results to obtain the query data corresponding to the query statement, thereby reducing task load when the database executes the query statement and improving efficiency of executing the query statement by the database.

S108: When executing the execution plan, perform deduplication on duplicate results included in query results obtained by executing the target operation, and obtain, based on deduplicated query results, query data corresponding to the query statement.

After the server determines the target operation, when executing the execution plan, the server can perform deduplication on the duplicate results included in the query results obtained by executing the target operation, and obtain, based on the deduplicated query results, the query data corresponding to the query statement.

Specifically, after determining the target operation, the server can determine, based on a position of an operation instruction corresponding to the target operation in the execution plan, a position for inserting the deduplication operation into the execution plan as a target position, then insert a deduplication operation instruction into the execution plan based on the target position to generate an optimized execution plan, and save the optimized execution plan to a historical execution plan. When the optimized execution plan is executed, the duplicate results included in the query results obtained by executing the target operation can be deduplicated based on the inserted deduplication operation instruction.

A method for inserting the deduplication operation instruction into the execution plan by the server may be: determining whether the deduplication operation for deduplicating the query results of the query operation included in the execution plan is a valid operation. Understandably, if yes, the deduplication operation included in the execution plan is copied to the target position; or if no, the deduplication operation included in the execution plan is adjusted to the target position.

In addition, to use historical information for optimizing the execution plan to further improve query efficiency in executing the query statement by the database, before determining the target operation, the database can first determine whether any historical execution plan among historical execution plans matches the execution plan. If no, the target operation is determined from the query operations based on the execution order of the query operations. If it is determined that a historical execution plan among the historical execution plans matches the execution plan, the target operation is determined from the query operations involved in the execution plan based on the historical execution plan matching the execution plan.

In the above-mentioned content, a method for determining whether any historical execution plan among the historical execution plans matches the execution plan may be: removing parameters in the execution plan, and then determining whether any historical execution plan among the historical execution plans is consistent with the execution plan after the parameters are removed. If yes, it is considered that the historical execution plan consistent with the execution plan after the parameters are removed is an execution plan matching the execution plan.

For example, assuming that the execution plan is to query the friends of the user named A, the execution plan after the parameters are removed is to query friends of a certain user. Then, it is found, in each historical execution plan, whether there is "query friends of a certain user". If yes, it is considered that this historical execution plan matches the execution plan.

Figure 2:
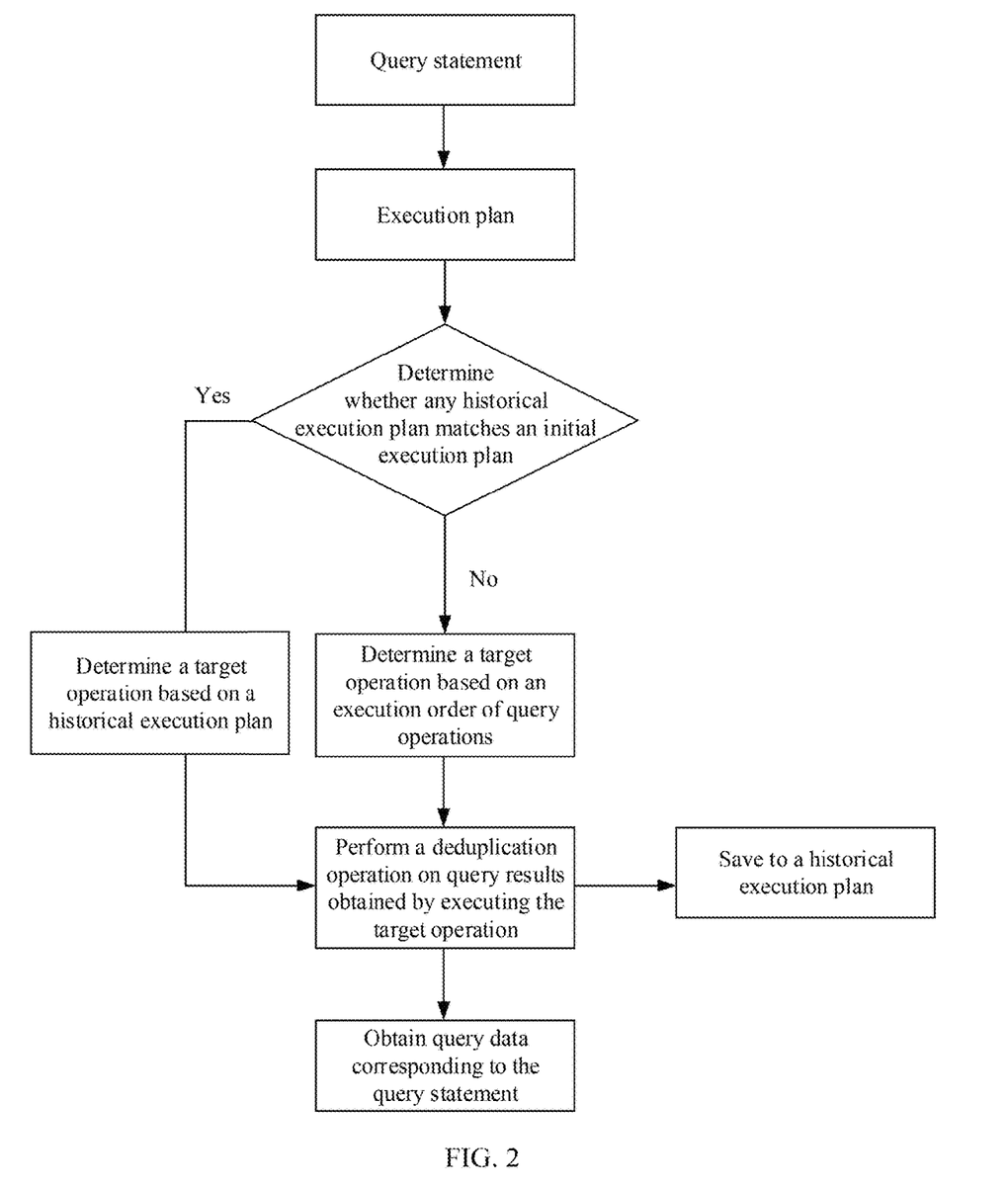
FIG. 2 is a schematic diagram illustrating a process of executing a query statement by a database, according to this specification.

For ease of understanding, this specification further provides a schematic diagram of an optimization process of the execution plan, as shown in FIG. 2.

FIG. 2 is a schematic diagram illustrating a process of executing the query statement by the database, according to this specification.

As can be learned from FIG. 2, after the database obtains the query statement input by the user, the execution plan corresponding to the query statement can be generated based on the query statement, and then whether any historical execution plan among the historical execution plans matches the generated execution plan is determined. If yes, the query operation that requires the deduplication operation is determined as the target operation based on the historical execution plan. If no, the query operation that requires the deduplication operation in the execution plan is determined as the target operation based on the execution order of the query operations involved in the execution plan. Then the position for inserting the deduplication operation in the execution plan can be determined based on the position of the operation instruction corresponding to the target operation in the execution plan, then the deduplication operation instruction can be inserted into the execution plan to generate the optimized execution plan, and the optimized execution plan is saved to the historical execution plan, so that when the optimized execution plan is executed, the duplicate results included in the query results obtained by executing the target operation can be deduplicated based on the inserted deduplication operation instruction, and the query data corresponding to the query statement can be obtained from the database based on the deduplicated query results.

As can be learned from the above-mentioned content, the server can determine, based on the execution order of the query operations involved in the execution plan generated when the query statement is executed by the database, which query operations in the execution plan corresponding to the query statement input by the user are subject to deduplication of query results. This can reduce the task load in subsequent query operations executed by the database and deduplicate the query results of the determined query operations, thereby improving efficiency of querying data in the database.

The foregoing is the data query method provided in one or more embodiments of this specification. Based on the same idea, this specification further provides a corresponding data query apparatus, as shown in FIG. 3.

Figure 3:
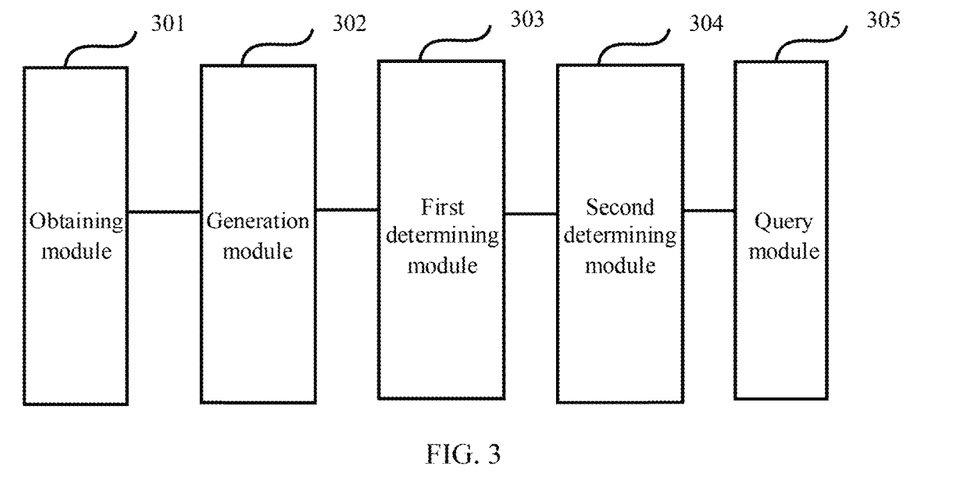
FIG. 3 is a schematic diagram illustrating a data query apparatus, according to this specification.

FIG. 3 is a schematic diagram illustrating a data query apparatus, according to this specification. The apparatus includes: an obtaining module 301, configured to obtain a query statement input by a user, where the query statement is used to query data from a database; a generation module 302, configured to generate, based on the query statement, an execution plan corresponding to the query statement; a first determining module 303, configured to determine, based on the execution plan, each query operation involved in the execution plan and an execution order of query operations; a second determining module 304, configured to determine a target operation from the query operations based on the execution order of the query operations, where the target operation is an operation other than a last query operation to be executed among the query operations; and a query module 305, configured to perform deduplication on duplicate results included in query results obtained by executing the target operation when executing the execution plan, and obtain, based on deduplicated query results, query data corresponding to the query statement.

Optionally, the generation module 302 is specifically configured to perform syntax parsing on the query statement to obtain a syntax tree corresponding to the query statement, and generate, based on the syntax tree, the execution plan corresponding to the query statement.

Optionally, the second determining module 304 is specifically configured to determine whether any historical execution plan among historical execution plans matches the execution plan, and if no, determine the target operation from the query operations based on the execution order of the query operations.

Optionally, the second determining module 304 is specifically configured to determine the target operation from the query operations based on the historical execution plan matching the execution plan if it is determined that a historical execution plan among the historical execution plans matches the execution plan.

Optionally, the second determining module 304 is specifically configured to determine, for each query operation involved in the execution plan, a query object corresponding to the query operation, and determine the target operation from the query operations based on an association relationship between query objects corresponding to the query operations and the execution order of the query operations.

Optionally, the query module 305 is specifically configured to determine, based on a position of an operation instruction corresponding to the target operation in the execution plan, a position for inserting a deduplication operation in the execution plan as a target position, insert a deduplication operation instruction into the execution plan based on the target position to generate an optimized execution plan, and when executing the optimized execution plan, perform, based on the inserted deduplication operation instruction, deduplication on the duplicate results included in the query results obtained by executing the target operation.

Optionally, the query module 305 is specifically configured to determine a deduplication operation instruction included in the execution plan, and add the included deduplication operation instruction to the target position.

This specification further provides a computer-readable storage medium. The storage medium stores a computer program, and the computer program can be configured to execute the above-mentioned data query method provided in FIG. 1.

Figure 4:
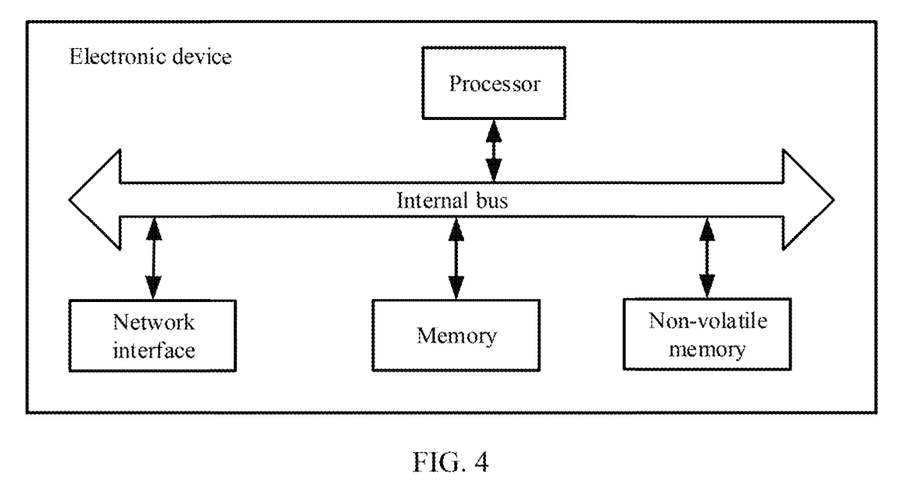
FIG. 4 is a schematic diagram illustrating an electronic device corresponding to FIG. 1, according to this specification.

This specification further provides a schematic diagram illustrating a structure of an electronic device, shown in FIG. 4, corresponding to FIG. 1. As shown in FIG. 4, in terms of hardware, the electronic device includes a processor, an internal bus, a network interface, a memory, and a non-volatile memory, and certainly can further include hardware needed by another service. The processor reads a corresponding computer program from the non-volatile memory into the memory and runs the computer program, to implement the above-mentioned data query method in FIG. 1. Certainly, in addition to a software implementation, this specification does not rule out another implementation, for example, a logic device or a combination of software and hardware. To be specific, an entity for executing the following processing procedure is not limited to each logic unit, and can be hardware or a logic device.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. Almost all designers program an improved method procedure into a hardware circuit to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. A designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The programming is similar to a software compiler used to develop and write a program. Before compilation, source code needs to be written in a particular programming language, which is referred to as a hardware description language (HDL). The HDL is not limited to only one type. Instead, there are many types of HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also be aware that a hardware circuit that implements a logical method procedure can be readily obtained once the method procedure is logically programmed by using the several hardware description languages and is programmed into an integrated circuit.

A controller can be implemented in any appropriate way. For example, the controller can include a microprocessor or a processor and a computer-readable medium storing computer-readable program code (such as software or firmware) executable by the microprocessor or the processor, a logic gate, a switch, an application-specific integrated circuit (ASIC), a programmable logic controller, and an embedded microcontroller. Examples of the controller include but are not limited to the following microcontrollers: ARC 625D, Atmel AT91SAM, Microchip PIC18F26K20, and Silicone Labs C8051F320. A memory controller can also be implemented as part of control logic of the memory. A person skilled in the art also knows that, in addition to implementing the controller in a form of pure computer-readable program code, a method step can be logically programmed, so that the controller implements the same function in a form of a logic gate, a switch, an application-specific integrated circuit, a programmable logic controller, an embedded microcontroller, etc. Therefore, the controller can be considered as a hardware component, and an apparatus configured to implement various functions in the controller can also be considered as a structure in the hardware component. Alternatively, the apparatus configured to implement various functions can even be considered as both a software module implementing the method and a structure in the hardware component.

The systems, apparatuses, modules, or units described in the above-mentioned embodiments can be specifically implemented by a computer chip or an entity, or can be implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the above-mentioned apparatus is described by dividing functions into various units. Certainly, in an implementation of this specification, functions of units can be implemented in the same or more software and/or hardware.

A person skilled in the art should understand that the embodiments of this specification can be provided as methods, systems, or computer program products. Therefore, this specification can use a form of hardware only embodiments, software only embodiments, or embodiments with a combination of software and hardware. In addition, this specification can use a form of a computer program product implemented on one or more computer-usable storage media (including but not limited to a magnetic disk storage, a CD-ROM, an optical storage, etc.) that include computer-usable program code.

This specification is described with reference to the flowcharts and/or block diagrams of the method, the device (system), and the computer program product according to some embodiments of this specification. It should be understood that computer program instructions can be used to implement each procedure and/or each block in the flowcharts and/or the block diagrams and a combination of a procedure and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a function specified in one or more procedures in the flowcharts and/or one or more blocks in the block diagrams.

These computer program instructions can also be stored in a computer-readable memory that can instruct a computer or another programmable data processing device to work in a specific way, so that an instruction stored in the computer-readable memory generates an artifact including an instruction apparatus, and the instruction apparatus implements a function specified in one or more procedures in the flowcharts and/or one or more blocks in the block diagrams.

Alternatively, these computer program instructions can be loaded onto a computer or another programmable data processing device, so that a series of operations and steps are performed on the computer or the another programmable device, to generate computer-implemented processing. Therefore, the instructions executed on the computer or the another programmable device provide steps for implementing a function specified in one or more procedures in the flowcharts and/or one or more blocks in the block diagrams.

In a typical configuration, a computing device includes one or more processors (CPUs), one or more input/output interfaces, one or more network interfaces, and one or more memories.

The memory may include a non-persistent memory, a random access memory (RAM), a non-volatile memory, and/or another form in a computer-readable medium, for example, a read-only memory (ROM) or a flash memory (flash RAM). The memory is an example of the computer-readable medium.

The computer-readable medium includes persistent, non-persistent, removable, and non-removable media that can store information by using any method or technology. The information can be a computer-readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer-readable medium does not include transitory media such as a modulated data signal and carrier.

It is worthwhile to further note that the terms "comprise", "include", or any other variant thereof are intended to cover a non-exclusive inclusion, so that a process, a method, a product, or a device that includes a list of elements not only includes those elements but also includes other elements which are not expressly listed, or further includes elements inherent to the process, method, product, or device. Without more constraints, an element preceded by "includes a . . . " does not preclude existence of other identical elements in the process, method, product, or device that includes the element.

A person skilled in the art should understand that the embodiments of this specification can be provided as methods, systems, or computer program products. Therefore, this specification can use a form of hardware only embodiments, software only embodiments, or embodiments with a combination of software and hardware. In addition, this specification can use a form of a computer program product implemented on one or more computer-usable storage media (including but not limited to a magnetic disk storage, a CD-ROM, an optical storage, etc.) that include computer-usable program code.

This specification can be described in a general context of a computer-executable instruction executed by a computer, for example, a program module. Generally, the program module includes a routine, a program, an object, a component, a data structure, etc. executing a specific task or implementing a specific abstract data type. This specification can also be practiced in a distributed computing environment in which tasks are executed by remote processing devices connected via a communication network. In the distributed computing environment, the program module can be located in both local and remote computer storage media including storage devices.

The embodiments of this specification are all described in a progressive way. Mutual reference can be made for the same or similar parts between the embodiments. Each embodiment focuses on differences from other embodiments. Particularly, a system embodiment is similar to a method embodiment, and therefore is described briefly. For related parts, reference can be made to related descriptions in the method embodiment.

The foregoing descriptions are merely some embodiments of this specification and are not intended to limit this specification. A person skilled in the art can make various modifications or changes to this specification. Any modification, equivalent replacement, or improvement made without departing from the spirit and principle of this application shall fall within the scope of the claims of this specification.

The invention claimed is:

1. A method, comprising:
obtaining a query statement input by a user, wherein the query statement queries data from a database;
generating, based on the query statement, an execution plan corresponding to the query statement;
determining, based on the execution plan, each query operation involved in the execution plan and an execution order of query operations;
determining a target operation from the query operations based on the execution order of the query operations, wherein the target operation is an operation other than a last query operation to be executed among the query operations; and
when executing the execution plan, performing deduplication on duplicate results comprised in query results obtained by executing the target operation to obtain deduplicated query results, and obtaining, based on the deduplicated query results, query data corresponding to the query statement, wherein:
before the performing deduplication on duplicate results comprised in query results obtained by executing the target operation to obtain deduplicated query results when executing the execution plan, the method further comprises:
determining, based on a position of an operation instruction corresponding to the target operation in the execution plan, a position for inserting a deduplication operation in the execution plan as a target position; and
inserting a deduplication operation instruction into the execution plan based on the target position to generate an optimized execution plan; and
the performing deduplication on duplicate results comprised in query results obtained by executing the target operation to obtain deduplicated query results when executing the execution plan comprises:
when executing the optimized execution plan, performing, based on the deduplication operation instruction, deduplication on the duplicate results comprised in the query results obtained by executing the target operation to obtain the deduplicated query results.

2. The method according to claim 1, wherein the generating, based on the query statement, an execution plan corresponding to the query statement comprises:
performing syntax parsing on the query statement to obtain a syntax tree corresponding to the query statement; and
generating, based on the syntax tree, the execution plan corresponding to the query statement.

3. The method according to claim 1, wherein the determining a target operation from the query operations based on the execution order of the query operations comprises:
determining that no historical execution plan among historical execution plans matches the execution plan; and
determining the target operation from the query operations based on the execution order of the query operations.

4. The method according to claim 1, wherein the determining a target operation from the query operations based on the execution order of the query operations comprises:

determining that a historical execution plan among the historical execution plans matches the execution plan; and determining the target operation from the query operations based on the historical execution plan matching the execution plan.

5. The method according to claim 1, wherein the determining a target operation from the query operations based on the execution order of the query operations comprises:

determining, for each query operation involved in the execution plan, a query object corresponding to the query operation; and determining the target operation from the query operations based on an association relationship between query objects corresponding to the query operations and the execution order of the query operations.

6. The method according to claim 1, wherein the inserting a deduplication operation instruction into the execution plan based on the target position comprises:

determining a deduplication operation instruction comprised in the execution plan; and adding the comprised deduplication operation instruction to the target position.

7. A computer-implemented device, comprising:

one or more processors; and one or more tangible, non-transitory, machine-readable media storing one or more instructions that, when executed by the one or more processors, perform one or more operations comprising:

obtaining a query statement input by a user, wherein the query statement queries data from a database;

generating, based on the query statement, an execution plan corresponding to the query statement;

determining, based on the execution plan, each query operation involved in the execution plan and an execution order of query operations;

determining a target operation from the query operations based on the execution order of the query operations, wherein the target operation is an operation other than a last query operation to be executed among the query operations; and when executing the execution plan, performing deduplication on duplicate results comprised in query results obtained by executing the target operation to obtain deduplicated query results, and obtaining, based on the deduplicated query results, query data corresponding to the query statement, wherein:

before the performing deduplication on duplicate results comprised in query results obtained by executing the target operation to obtain deduplicated query results when executing the execution plan, the operations further comprise:

determining, based on a position of an operation instruction corresponding to the target operation in the execution plan, a position for inserting a deduplication operation in the execution plan as a target position; and inserting a deduplication operation instruction into the execution plan based on the target position to generate an optimized execution plan; and the performing deduplication on duplicate results comprised in query results obtained by executing the target operation to obtain deduplicated query results when executing the execution plan comprises:

when executing the optimized execution plan, performing, based on the deduplication operation instruction, deduplication on the duplicate results comprised in the query results obtained by executing the target operation to obtain the deduplicated query results.

8. The computer-implemented device according to claim 7, wherein the generating, based on the query statement, an execution plan corresponding to the query statement comprises:

performing syntax parsing on the query statement to obtain a syntax tree corresponding to the query statement; and generating, based on the syntax tree, the execution plan corresponding to the query statement.

9. The computer-implemented device according to claim 7, wherein the determining a target operation from the query operations based on the execution order of the query operations comprises:

determining that no historical execution plan among historical execution plans matches the execution plan; and determining the target operation from the query operations based on the execution order of the query operations.

10. The computer-implemented device according to claim 7, wherein the determining a target operation from the query operations based on the execution order of the query operations comprises:

determining that a historical execution plan among the historical execution plans matches the execution plan; and determining the target operation from the query operations based on the historical execution plan matching the execution plan.

11. The computer-implemented device according to claim 7, wherein the determining a target operation from the query operations based on the execution order of the query operations comprises:

determining, for each query operation involved in the execution plan, a query object corresponding to the query operation; and determining the target operation from the query operations based on an association relationship between query objects corresponding to the query operations and the execution order of the query operations.

12. The computer-implemented device according to claim 7, wherein the inserting a deduplication operation instruction into the execution plan based on the target position comprises:

determining a deduplication operation instruction comprised in the execution plan; and adding the comprised deduplication operation instruction to the target position.

13. A non-transitory, computer-readable medium storing one or more instructions executable by a computer system to perform operations comprising:

obtaining a query statement input by a user, wherein the query statement queries data from a database;

generating, based on the query statement, an execution plan corresponding to the query statement;

determining, based on the execution plan, each query operation involved in the execution plan and an execution order of query operations;

determining a target operation from the query operations based on the execution order of the query operations, wherein the target operation is an operation other than a last query operation to be executed among the query operations; and when executing the execution plan, performing deduplication on duplicate results comprised in query results obtained by executing the target operation to obtain deduplicated query results, and obtaining, based on the deduplicated query results, query data corresponding to the query statement, wherein:

before the performing deduplication on duplicate results comprised in query results obtained by executing the target operation to obtain deduplicated query results when executing the execution plan, the operations further comprise:

determining, based on a position of an operation instruction corresponding to the target operation in the execution plan, a position for inserting a deduplication operation in the execution plan as a target position; and inserting a deduplication operation instruction into the execution plan based on the target position to generate an optimized execution plan; and the performing deduplication on duplicate results comprised in query results obtained by executing the target operation to obtain deduplicated query results when executing the execution plan comprises:

when executing the optimized execution plan, performing, based on the deduplication operation instruction, deduplication on the duplicate results comprised in the query results obtained by executing the target operation to obtain the deduplicated query results.

14. The non-transitory, computer-readable medium according to claim 13, wherein the generating, based on the query statement, an execution plan corresponding to the query statement comprises:

performing syntax parsing on the query statement to obtain a syntax tree corresponding to the query statement; and generating, based on the syntax tree, the execution plan corresponding to the query statement.

15. The non-transitory, computer-readable medium according to claim 13, wherein the determining a target operation from the query operations based on the execution order of the query operations comprises:

determining that no historical execution plan among historical execution plans matches the execution plan; and determining the target operation from the query operations based on the execution order of the query operations.

16. The non-transitory, computer-readable medium according to claim 13, wherein the determining a target operation from the query operations based on the execution order of the query operations comprises:

determining that a historical execution plan among the historical execution plans matches the execution plan; and determining the target operation from the query operations based on the historical execution plan matching the execution plan.

17. The non-transitory, computer-readable medium according to claim 13, wherein the determining a target operation from the query operations based on the execution order of the query operations comprises:

determining, for each query operation involved in the execution plan, a query object corresponding to the query operation; and determining the target operation from the query operations based on an association relationship between query objects corresponding to the query operations and the execution order of the query operations.

18. The non-transitory, computer-readable medium according to claim 13, wherein the inserting a deduplication operation instruction into the execution plan based on the target position comprises:

determining a deduplication operation instruction comprised in the execution plan; and adding the comprised deduplication operation instruction to the target position.

* * * * *